(12) United States Patent
Lynggaard et al.

(10) Patent No.: US 8,416,463 B2
(45) Date of Patent: Apr. 9, 2013

(54) PRINTING OF A POSITION-CODING PATTERN

(75) Inventors: Stefan Lynggaard, Lund (SE); Tommy Sighagen, Ramlösa (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 12/532,603

(22) PCT Filed: Mar. 19, 2008

(86) PCT No.: PCT/SE2008/050314
§ 371 (c)(1),
(2), (4) Date: Sep. 22, 2009

(87) PCT Pub. No.: WO2008/118079
PCT Pub. Date: Oct. 2, 2008

(65) Prior Publication Data
US 2010/0134848 A1 Jun. 3, 2010

Related U.S. Application Data

(60) Provisional application No. 60/907,183, filed on Mar. 23, 2007.

(30) Foreign Application Priority Data

Mar. 23, 2007 (SE) .................... 0700746-1

(51) Int. Cl.
*H04N 1/40* (2006.01)
*G06K 9/00* (2006.01)
*G06F 7/00* (2006.01)
*H04L 9/32* (2006.01)

(52) U.S. Cl. ........ 358/3.28; 382/100; 707/803; 713/176

(58) Field of Classification Search .................. None
See application file for complete search history.

(56) References Cited

U.S. PATENT DOCUMENTS

| 5,442,147 A | 8/1995 | Burns et al. |
| 5,629,499 A | 5/1997 | Flickinger et al. |

(Continued)

FOREIGN PATENT DOCUMENTS

| AU | 2003/254715 | 11/2003 |
| GB | 2306669 A | 5/1997 |

(Continued)

OTHER PUBLICATIONS

Office Action mailed Aug. 4, 2011 from the U.S. Patent and Trademark Office in U.S. Appl. No. 12/296,650 (21 pages).

(Continued)

*Primary Examiner* — Barbara Reinier
(74) *Attorney, Agent, or Firm* — Finnegan, Henderson, Farabow, Garrett & Dunner LLP

(57) ABSTRACT

The present invention relates to a method in a computer for creating an electronic document to be printed, said document comprising a page description representing a layout of the document, said method comprising: retrieving a license from a database, said license defining a position-coding pattern, which is capable of encoding positions on a product when printed, selecting at least a portion of the position-coding pattern in the retrieved license to be associated with the page description, forming a sublicense from said license, said sublicense comprising a definition of the selected at least portion of the position-coding pattern, an indication of an origin of the sublicense to enable assuring that the sublicense stems from a trusted actor, and a data record allowing verification of integrity of the sublicense to enable assuring that the sublicense has not been tampered with, and associating said sublicense with said page description. The invention also relates to a method for verifying a sublicense to a portion of the position-coding pattern.

14 Claims, 10 Drawing Sheets

U.S. PATENT DOCUMENTS

| | | | |
|---|---|---|---|
| 5,661,506 | A | 8/1997 | Lazzouni et al. |
| 5,852,434 | A | 12/1998 | Sekendur |
| 5,900,943 | A | 5/1999 | Owen |
| 5,937,110 | A | 8/1999 | Petrie et al. |
| 6,330,976 | B1 | 12/2001 | Dymetman et al. |
| 6,570,104 | B1 | 5/2003 | Ericson et al. |
| 6,663,008 | B1 | 12/2003 | Pettersson et al. |
| 6,667,695 | B2 | 12/2003 | Pettersson et al. |
| 6,864,880 | B2 | 3/2005 | Hugosson et al. |
| 6,865,608 | B2 | 3/2005 | Hunter |
| 6,870,966 | B1 | 3/2005 | Silverbrook et al. |
| 6,952,497 | B1 | 10/2005 | Hollström et al. |
| 7,069,026 | B2 | 6/2006 | McClure |
| 7,281,273 | B2 | 10/2007 | Strom et al. |
| 7,398,055 | B2 | 7/2008 | Tajima et al. |
| 2001/0038349 | A1 | 11/2001 | Hugosson et al. |
| 2002/0000981 | A1 | 1/2002 | Hugosson et al. |
| 2002/0033844 | A1* | 3/2002 | Levy et al. ............... 345/744 |
| 2002/0035687 | A1 | 3/2002 | Skantze |
| 2002/0091711 | A1 | 7/2002 | Ericson |
| 2002/0122568 | A1* | 9/2002 | Zhao ............... 382/100 |
| 2003/0046256 | A1 | 3/2003 | Hugosson et al. |
| 2003/0061188 | A1 | 3/2003 | Wiebe et al. |
| 2003/0095725 | A1 | 5/2003 | Kia et al. |
| 2003/0196110 | A1 | 10/2003 | Lampson et al. |
| 2003/0217288 | A1 | 11/2003 | Guo et al. |
| 2004/0010722 | A1 | 1/2004 | Ha |
| 2004/0064711 | A1 | 4/2004 | Fernando et al. |
| 2004/0085287 | A1 | 5/2004 | Wang et al. |
| 2004/0127196 | A1 | 7/2004 | Dabbish et al. |
| 2005/0134563 | A1 | 6/2005 | Hugosson et al. |
| 2005/0271246 | A1* | 12/2005 | Sharma et al. ............... 382/100 |
| 2006/0210108 | A1* | 9/2006 | Brunk et al. ............... 382/100 |
| 2007/0047002 | A1* | 3/2007 | Hull et al. ............... 358/3.28 |
| 2007/0098161 | A1* | 5/2007 | Ibrahim et al. ............... 380/55 |
| 2009/0019292 | A1 | 1/2009 | Fransson et al. |
| 2009/0204821 | A1 | 8/2009 | Fransson et al. |

FOREIGN PATENT DOCUMENTS

| | | |
|---|---|---|
| WO | WO 99/05816 | 2/1999 |
| WO | WO 00/31682 | 6/2000 |
| WO | WO 00/72110 A2 | 11/2000 |
| WO | WO 00/72246 A1 | 11/2000 |
| WO | WO 01/02947 A1 | 1/2001 |
| WO | WO 02/075630 A1 | 9/2002 |
| WO | WO 03/005181 A1 | 1/2003 |
| WO | WO 2004/061732 A1 | 7/2004 |
| WO | WO 2005/057471 A1 | 6/2005 |
| WO | WO 2006/001769 A1 | 1/2006 |
| WO | WO 2006/004505 A1 | 1/2006 |
| WO | WO 2006/004506 A1 | 1/2006 |
| WO | WO 2006/041387 A1 | 4/2006 |
| WO | WO 2007/097693 A1 | 8/2007 |
| WO | WO 2007/117201 A1 | 10/2007 |

OTHER PUBLICATIONS

Kashiwagi, et al., "A Study of Ways to Share Smart Card Application Services", IEICE Technical Report, The Institute of Electronics, Information and Communication Engineers, vol. 101, No. 742, Mar. 15, 2002, pp. 65-71.

Kurosawa, et al., "Introduction to Modern Cryptography", Corona Publishing Co., Ltd., First Edition, Mar. 31, 2004, p. 52 and translation thereof. (5 pages including 3 pages of the article and 2 pages of translation).

Office Action mailed Nov. 8, 2011 from the U.S. Patent and Trademark Office in U.S. Appl. No. 11/665,020 (36 pages).

Office Action delivered electronically on Dec. 24, 2009 from the U.S. Patent and Trademark Office for U.S. Appl. No. 11/665,020 (18 pages).

Office Action mailed Jul. 20, 2010 from the U.S. Patent and Trademark Office for U.S. Appl. No. 11/665,020 (25 pages).

* cited by examiner

PRINTING OF A POSITION-CODING PATTERN

CROSS REFERENCE TO RELATED APPLICATION

This application is a National Phase application based on PCT/SE2008/050314 filed Mar. 19, 2008, which claims the priority of Swedish Patent Application No. 0700746-1, filed Mar. 23, 2007, and claims the benefit of U.S. Provisional Application No. 60/907,183, filed Mar. 23, 2007, the content of all of which is incorporated herein by reference.

FIELD OF THE INVENTION

The present invention generally relates to printing of a position-coding pattern, which allows encoding of positions on a printed product. Specifically, the invention relates to methods and devices for assigning a position-coding pattern to a page description and for outputting the page description and the position-coding pattern to a printer.

BACKGROUND ART

The Applicant of the present invention has developed a system for digitizing use of a pen and a writing surface. A writing surface, such as a paper, is provided with a position-coding pattern. An electronic pen is used for writing on the writing surface, while at the same time being able to record positions of the position-coded surface. The electronic pen detects the position-coding pattern by means of a sensor and calculates positions corresponding to written pen strokes. Such a position-coding pattern is described e.g. in U.S. Pat. No. 6,663,008.

The position-coding pattern is capable of coding co-ordinates of a large number of positions. Thus, the pattern can be seen as forming a virtual surface or reference surface which is defined by all positions that the pattern is capable of coding, different positions on the virtual surface being dedicated for different functions, or services, and/or actors. As described in US 2003/0061188, the virtual surface is typically logically divided into different subsets, wherein a subset may include confined areas of the pattern. Such confined areas may have a size corresponding to that of physical pages, and therefore be denoted pattern pages, each pattern page being represented by a unique page address.

It is possible to capture written information in a digital form by writing with the electronic pen on a writing surface provided with the position-coding pattern. This may be utilized in capturing information from forms for filling in information by writing. In this regard, each copy of a form may suitably be provided with a unique portion of the position-coding pattern to enable distinguishing between information filled in on different copies of the form.

The writing surfaces may be designed to provide human-understandable information for guiding a user in entering information on the writing surface. In designing the writing surface, a portion of the position-coding pattern is coupled to the human-understandable information. Also, controlling software may be designed to associate instructions for handling strokes of a pen in different areas of a writing surface. The controlling software is associated with a portion of the position-coding pattern such that detected positions by an electronic pen may be associated with specific instructions. Thus, the written information may be appropriately handled by the electronic pen or a computer system to which the written information is transferred.

It may be important that different designs of writing surfaces are not associated with the same portion of the position-coding pattern, since this may cause confusion if a pen user uses a first design for entering information and the pen or computer system uses controlling software corresponding to a second design for interpreting the entered information. Therefore, a top controlling actor may issue licenses to portions of the position-coding pattern to ensure that only one party receives a right to handle each portion of the position-coding pattern.

Thus, as shown in FIG. 8, a party 800 that wants to use electronic pens for capturing information may design writing surfaces and use a license received from the top controlling actor to associate a portion of the position-coding pattern with the design. In this regard, the designer 800 uses a dedicated software tool which facilitates creation of the design. The tool may further associate unique position-coding pattern with each copy of the design that is to be printed. When a design is to be printed, the software tool provides a graphical representation of the design and the position-coding pattern. The graphical representation may be provided e.g. as a postscript file suitable for being transmitted to a printer for printing.

If the party (designer) 800 wants to print a large number of pages, the printing may be advantageously performed by a print shop 810. In this regard, the designer 800 would like to send the graphical representation to the print shop 810 for printing. However, since the unique position-coding pattern requires that each copy of the design is individually defined in the graphical representation, the graphical representation will require a large amount of data. Thus, very large files need to be transmitted to the print shop 810, which is not practical. Further, the postscript file does not allow the print shop 810 to adapt the printing of the position-coding pattern to changing conditions at printing, which may affect the printing quality and hence the possibility for an electronic pen to detect positions. Moreover, the designer 800 and the print shop 810 need to interact so that the tool may form an electronic document that is adapted to the specific printer or printing press of the print shop 810.

In order to overcome these problems, the designer 800 may instead transmit only the design of the writing surface. In this case, the designer 800 will also need to transmit the license to the position-coding pattern to the print shop 810, such that the print shop 810 may be able to couple position-coding pattern to the design. Thus, substantial processing needs to be performed at the print shop 810 for preparing a file to be printed. Also, the designer 800 will need to transmit the entire license to the print shop 810, thereby loosing control of the license. Further, the print shop 810 will also need to run the dedicated software tool for associating the design of the writing surface with position-coding pattern.

SUMMARY OF THE INVENTION

An object of the invention is to provide an improved handling of position-coding pattern for printing of the position-coding pattern. A specific object of the invention is to avoid the need of transmitting large files for printing of the position-coding pattern.

Generally, the objects of the invention are at least partly achieved by means of a method, a computer program and a device for assigning a position-coding pattern to a page-describing document for printing the document, a method, computer program and a device for outputting a page-describing document and a position-coding pattern to a printer, and a system for developing and printing an electronic document.

According to a first aspect of the invention, there is provided a method in a computer for creating an electronic document to be printed, said document comprising a page description representing a layout of the document, said method comprising: retrieving a license from a database, said license defining a position-coding pattern, which is capable of encoding positions on a product when printed; selecting at least a portion of the position-coding pattern in the retrieved license to be associated with the page description, forming a sublicense from said license, said sublicense comprising a definition of the selected at least portion of the position-coding pattern, an indication of an origin of the sublicense to enable assuring that the sublicense stems from a trusted actor, and a data record allowing verification of integrity of the sublicense to enable assuring that the sublicense has not been tampered with; and associating said sublicense with said page description.

According to a second aspect of the invention, there is provided a computer program product, directly loadable into the internal memory of a processor in a computer unit, comprising software instructions that, when executed in said processor, perform the method according to the first aspect of the invention.

According to a third aspect of the invention, there is provided a device for creating an electronic document to be printed, said document comprising a page description representing a layout of the document, said device comprising: a license database, which stores licenses defining a position-coding pattern, which is capable of encoding positions on a product when printed; and a processor, which is connected to the license database, and which is adapted to retrieve a license from the license database, the processor being adapted to process the retrieved license to select at least a portion of the position-coding pattern in the retrieved license to be associated with the page description, to form a sublicense from said license, said sublicense comprising a definition of the selected at least portion of the position-coding pattern, an indication of an origin of the sublicense to enable assuring that the sublicense stems from a trusted actor, and a data record allowing verification of integrity of the sublicense to enable assuring that the sublicense has not been tampered with, and to associate said sublicense with said page description.

According to a fourth aspect of the invention, there is provided a method for outputting an electronic document to a printer for printing the document, said document comprising a page description and a position-coding pattern allowing encoding of positions on the printed document, said method comprising: receiving a page description and a sublicense to a selected portion of the position-coding pattern, said sublicense comprising a definition of the selected portion of the position-coding pattern, an indication of an origin of the sublicense, and a data record allowing verification of integrity of the sublicense; examining the sublicense to determine whether printing of the document is to be allowed, said examining comprising: checking the indication of the origin of the sublicense to assure that the sublicense stems from a trusted actor, and checking the data record allowing verification of integrity to assure that the sublicense has not been tampered with; and if any of the checks fails, preventing the printing of the document.

According to a fifth aspect of the invention, there is provided a computer program product, directly loadable into the internal memory of a processor in a computer unit, comprising software instructions that, when executed in said processor, perform the method according to the fourth aspect of the invention.

According to a sixth aspect of the invention, there is provided a device for outputting an electronic document to a printer for printing the document, said document comprising a page description and a position-coding pattern allowing encoding of positions on the printed document, said device comprising: a processor which is adapted to receive an electronic document comprising a page description and a sublicense to a selected portion of the position-coding pattern, said sublicense comprising a definition of the selected portion of the position-coding pattern, an indication of an origin of the sublicense, and a data record allowing verification of integrity of the sublicense, the processor being further adapted to process the received electronic document to examine the sublicense to determine whether printing of the document is to be allowed, said examining comprising: checking the indication of the origin of the sublicense to assure that the sublicense stems from a trusted actor, and checking the data record allowing verification of integrity to assure that the sublicense has not been tampered with, and the processor being adapted to prevent the printing of the document if the examining determines that printing is not to be allowed.

According to a seventh aspect of the invention, there is provided a system for developing and printing an electronic document, said system comprising: a design unit, which is arranged to run a software program that is adapted to create a page description, which represents a layout of the document; a sublicensing unit, which is adapted to retrieve a license from a database, said license defining a position-coding pattern, which is capable of encoding positions on a product when printed, the sublicensing unit further being arranged to run a software program that is adapted to select at least a portion of the position-coding pattern in the retrieved license to be associated with the page description, forming a sublicense from said license, said sublicense comprising a definition of the selected at least portion of the position-coding pattern, an indication of an origin of the sublicense to enable assuring that the sublicense stems from a trusted actor, and a data record allowing verification of integrity of the sublicense to enable assuring that the sublicense has not been tampered with, and associating said sublicense with said page description; and a printing unit, which is arranged to receive the page description and the sublicense from the sublicensing unit, the printing unit further being arranged to run a software program that is adapted to read and examine the sublicense in order to ensure that the sublicense stems from a trusted actor and has not been tampered with.

As used herein, an electronic document comprises a design of a writing surface, which may later be printed for obtaining a hard copy of the design. The electronic document comprises a physical layout that defines human-understandable information on the writing surface. The physical layout may include information for guiding a pen user where to enter information on the page. The electronic document may further comprise a mapping layout which is a general description of how the position-coding pattern of a pattern page should be placed on the writing surface. Thus, the mapping layout defines which areas of the writing surface that should be provided with position-coding pattern. Also, the mapping layout defines how a portion of the position-coding pattern should be cut to associate position-coding pattern to the desired areas. However, the mapping layout does not include the actual portions of the position-coding pattern that eventually is to be printed on the writing surface. The physical layout and the mapping layout describe the common characteristics of copies of the physical layout that are each provided with unique portions of the position-coding pattern. Therefore, the physical layout and the mapping layout are called a page description.

The mapping layout facilitates printing of several copies of a physical layout with unique position-coding pattern on each copy, since each unique portion of the position-coding pattern that is assigned to a common physical layout should be mapped onto the physical layout in the same way. Since the position-coding pattern is unique for each copy of a design, each copy contains information that is specific to the copy. The electronic document further comprises a sublicense to a portion of the position-coding pattern, which allows the position-coding pattern to be combined with the physical layout in accordance with the mapping layout.

The physical layout may provide the layout of one or more pages. Further, as noted above, one or more copies of the physical layout may be printed. Thus, the electronic document may define one or more copies of one or more pages.

The electronic document may be a file comprising the page description and the sublicense. However, the electronic document need not be a single file. Instead, the page description and the sublicense may be associated with each other in any way, by e.g. providing pointers to each other, thus forming the electronic document.

The physical layout may be represented as e.g. a picture, a page-describing code (e.g. a Postscript file or a Printer Command Language file), or a pointer to a memory or network address where the layout is stored.

A general advantage of these aspects is that a sublicense is created to a specific portion of the position-coding pattern required to be used in the electronic document. Thus, it is possible to select only the portion of the position-coding pattern that is needed for printing the document. In this way, a party that has obtained a license may transmit only a sublicense to the selected portion of the position-coding pattern for allowing another party to print the electronic document. Thus, the transmitting party stands no risk of its license being used by another party outside of the allocated portion of the position-coding pattern.

Moreover, since the sublicense comprises an indication of the origin of the sublicense, it may be verified that the sublicense stems from a trusted actor. This implies that a software program which is to receive the sublicense may have a built-in definition of trusted actors, such that the software program may only accept sublicensing with a correct origin. For example, the software program may comprise an embedded decryption key for decrypting the indication of the origin. The decryption key may be adapted to decrypt information that is encrypted by an encryption key owned by the trusted actor. Thus, if the decrypting may be correctly performed, it may be concluded that the sublicense stems from the trusted actor.

Also, thanks to the data record allowing verification of integrity of the sublicense, it is possible to verify that the license has not been tampered with. Thus, a software program which is to receive the sublicense may only accept the sublicense if it has not been tampered with. This gives a security on behalf of the issuer of the sublicense, since a receiving party may not manipulate the license to obtain access to a portion of the position-coding pattern that was not part of the sublicense.

According to one embodiment, the sublicense comprises area identifiers for providing the definition of the selected at least portion of the position-coding pattern. The area identifier does not contain a representation of the actual physical appearance of the position-coding pattern but may be used to unambiguously obtain the specific physical appearance of the selected portion of the position-coding pattern. Thus, a representation is obtained requiring a very small amount of memory so that the representation is suitable to be transmitted between different parties. For example, the position-coding pattern may be logically divided into pages. Then the area identifiers may provide a page address of a starting position of the selected position-coding pattern and a page address of an ending position. Alternatively, the area identifiers may define corners of the area in terms of absolute positions. As a further alternative, it may be sufficient to provide an area identifier providing the starting position of the selected position-coding pattern. The extent of the portion of the position-coding pattern is determined by the number of pages that are to be printed.

The sublicense facilitates that a party that has obtained a right to a portion of a position-coding pattern to utilize other parties for performing operations on the position-coding pattern. The party may provide the definition of the portion of the position-coding pattern without a risk that the portion will be used to a further extent than allowed by the party. This enables that the portion of the position-coding pattern may be defined by area identifiers, which in theory may be easily manipulated. However, the sublicense further provides features for verifying that the sublicense has not been tampered with. Therefore, there is no possibility for a party that receives the sublicense to alter the definition of the position-coding pattern and be able to use this manipulated sublicense.

Still other objectives, features, aspects and advantages of the present invention will appear from the following detailed disclosure, from the attached dependent claims as well as from the drawings.

BRIEF DESCRIPTION OF DRAWINGS

The invention will now be described in more detail with reference to the accompanying schematic drawings.

DETAILED DESCRIPTION OF EMBODIMENTS

Figure 1A:
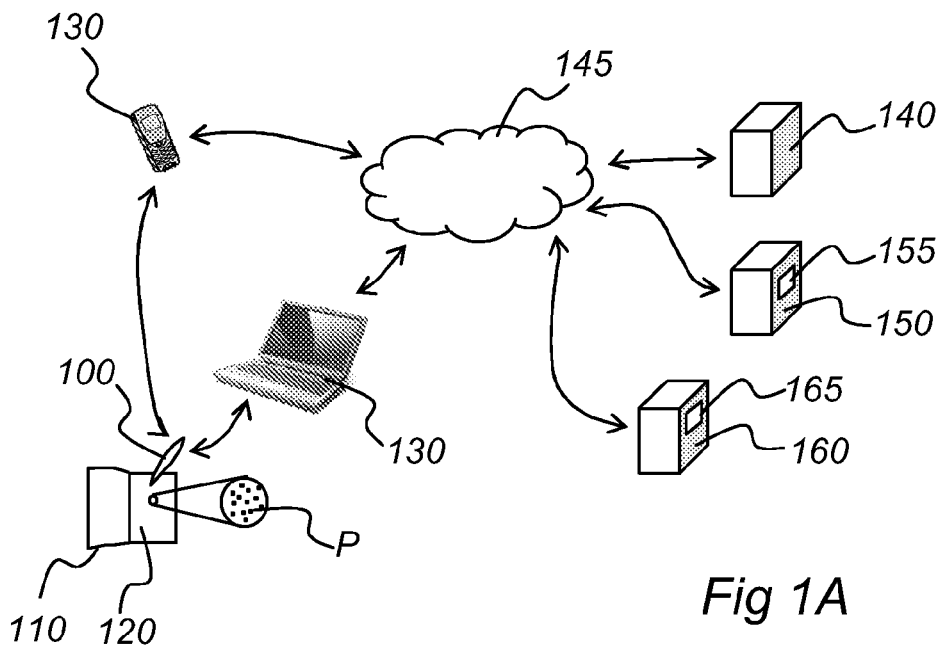
FIG. 1A schematically shows a system for using electronic pens in conjunction with writing surfaces which are provided with a position-coding pattern.

FIG. 1A illustrates an embodiment of a system for using electronic pens in conjunction with printed products. The system includes a plurality of electronic pens 100 and a plurality of products 110 with a position-coding pattern P covering a writing surface 120. However, in the Figure, only one electronic pen and one product are shown. The position-coding pattern P codes absolute positions or co-ordinates within a virtual surface. It is to be understood that the virtual surface is huge, typically in the range of $1$-$10^7$ km$^2$. Thus, only a small portion of the position-coding pattern P is needed to cover a writing surface 120.

The position-coding pattern P may be a pattern as described in U.S. Pat. No. 6,667,695, which is incorporated herein by reference. However, other types of position-coding patterns are equally possible within the scope of the present invention, for example those disclosed in U.S. Pat. No. 6,663,008; U.S. Pat. No. 6,570,104; U.S. Pat. No. 6,330,976; and US 2004/0085287.

The virtual surface of the position-coding pattern P is logically subdivided into individually addressable units. An example is given in FIG. 1B, where the virtual surface 180, or part thereof, is partitioned into a hierarchical structure of page units. Specifically, the virtual surface 180 is divided into a number of segments 190, each segment 190 being divided into a number of shelves 191, each shelf 191 being divided into a number of books 192, and each book 192 being divided into a number of page units or pattern pages 193. The pen is capable of correlating a determined absolute position to a certain area or part of the position-coding pattern, and to a certain local position within that area or part. Such an area or part is in this example a certain pattern page, which is identified using the format: segment.shelf.book.page (e.g., 1.2.3.4 would denote pattern page 4 of book 3, on shelf 2, in segment 1). This notation defines a page address. Thus, each determined absolute position in the global coordinate system 194 of the virtual surface represents position data which may be interpreted as a logical position within the virtual surface in the form of a page address and a local position within a pattern page 193, given in a local coordinate system 195.

A pattern page may typically have a size such that the position-coding pattern P of the pattern page fits a size of a writing surface 120. The position-coding pattern P on a product 110 may thus correspond to one or more pattern pages.

In the following, the page address format is not only used to identify a specific pattern page, but also to identify a range of pattern pages, by using the notation 1.2.3.x, 1.2.x.x, or 1.x.x.x, where x denotes all pattern pages of a specific book, shelf, and segment, respectively. This addressing scheme is further described in US 2003/0061188, which is incorporated herein by reference. It is to be understood that other partitions of the virtual surface and other addressing schemes are equally possible and that such partitions and addressing schemes also would fall within the scope of the present invention.

The electronic pen 100 is able to detect symbols of the position-coding pattern P and thereby determine the corresponding absolute co-ordinates of a position of the electronic pen 100. In this way, the electronic pen 100 is able to record information written using the electronic pen 100 on the writing surface 120 by detecting a sequence of positions traversed by the electronic pen 100 during writing. The information will typically be a page address and a sequence of locations on the relevant pattern page. The detection is accomplished by means of a sensor and various memory and processing circuitry included within the pen 100. The electronic pen 100 typically stores definition data representing the hierarchical structure of FIG. 1B, which allows the pen to derive the relevant page address and local positions based upon the recorded absolute coordinates.

The sequence of locations may be related to each other in order to create a digital representation of the written information, e.g. in the form of an image of written strokes or in the form of one or more recognized characters. The sequence of locations may also relate the written information to a specific area of the position-coding pattern P. This specific area may be associated with instructions for handling the written information, e.g. as data of a record in a database or as an address to which information is to be transmitted. The electronic pen 100 is also able to record information by detecting specific positions on the writing surface 120, which specific positions are associated with a certain function or operation. In this case, it is sufficient to detect a single position associated with the function and no further handling of the position or sequence of positions may be needed.

Figure 2:
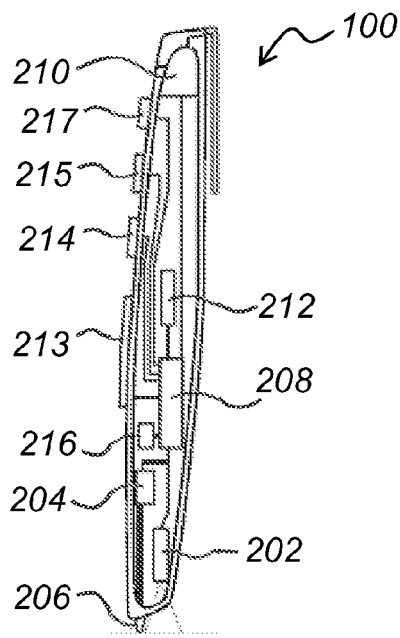
FIG. 2 is a schematic illustration of an electronic pen.

As shown in FIG. 2, the electronic pen 100 has a camera system 202 which is triggered to continuously capture images (typically at a rate of 70-100 frames per second) by a proximity sensor 204 indicating that a pen tip 206 is in close enough proximity to the writing surface 120. The images are processed by one or more data processors 208 in the pen to derive a sequence of positions. The resulting positions are then either processed by a pen operating system running on the data processor 208 in the pen 100 or transferred via a communications interface 210 to an auxiliary device 130, 160, such as a mobile phone or a computer unit, for being processed therein. The pen 100 also has a memory block 212 that includes both working memory and persistent-storage memory. Software is stored in the memory block 212 and is executed by the data processor 208 to provide the pen operating system. Each pen also has a unique identity, a pen ID, which is stored as fixed property in the memory block 212. The pen 100 may also have further hardware resources such as a display 213, a speaker 214, a microphone 215, a vibrator 216, one or more indicator lamps 217, etc.

The software to be executed by the data processor 208 for providing an overall pen control system may be received by the electronic pen 100 via the communications interface 210. The electronic pen 100 may thus receive updated controlling software or may receive new controlling software that may associate controlling instructions to portions of the position-coding pattern P that has no previous associated control in the electronic pen 100.

Returning now to FIG. 1A, one or more Application Service Providers (ASP) 150 may run a software program 155 that allows designing the writing surface 120 of products 110. The design includes both a physical layout and a mapping layout of the product. The physical layout includes supporting graphics, i.e. human-understandable information aimed at guiding a user to input information with an electronic pen 100 on proper positions on the writing surface 120. Thus, the intended processing of detected positions may be achieved. The mapping layout defines the placement and size of specific areas that are to be provided with a position-coding pattern. The mapping layout provides a template for how a portion of the position-coding pattern, e.g. a pattern page is to be mapped onto the writing surface. Thus, the mapping layout designs how a theoretical portion of the position-coding pattern is to be mapped. The design including the physical layout and the mapping layout is hereinafter called a page description. The ASP may create page descriptions using the software program 155, for example to design forms for entering information into a computer system.

Further, the ASP 150 may select a portion of the position-coding pattern to be associated with the page description. The position-coding pattern will encode positions on the writing surface, such that positions encoded by the position-coding pattern may be detected and identified by an electronic pen. The selected portion of the position-coding pattern will then replace the template of the mapping layout in order to provide actual position-coding pattern to the writing surface. The portion of the position-coding pattern will be provided on the writing surface in accordance with the mapping layout.

The position-coding pattern and the page description may be associated with each other by e.g. being packed into a common file or in an archive file. As a further alternative, the page description may contain a pointer to the position-coding pattern or vice versa. In any case, the page description and the position-coding pattern are arranged to indicate that they relate to each other.

Thus, when a position-coding pattern has been associated with a page description, the page description and the position-coding pattern form an electronic document that may be printed on a product. The printing may be performed by the ASP 150, and the printed products may be distributed to pen users.

It should be noted, as will be described in further detail below, that the position-coding pattern may be provided in the form of a license, which may define the area or boundaries of the position-coding pattern. Thus, the position-coding pattern may be provided in a compact form. The exact appearance of the position-coding pattern need not be created until the position-coding pattern is to be printed on a product.

Designed forms may be used by a user organization for digitally capturing information entered by electronic pens on products. The digitally captured information may be incorporated into a computer system 160 having a data management system for handling the information. For example, the user organization may be a healthcare organization, wherein patient information is recorded on paper forms and is digitally captured to be incorporated into the data management system of the healthcare organization. The design of the forms used may control how the recorded information is stored such that it is associated with correct fields in the data management system.

The allocation of position-coding pattern and the printing of the page description with the pattern need not be performed by the ASP 150. Instead, the ASP 150 may merely design the page description, which may be transferred to a user organization. When forms are needed allocation of position-coding pattern for the number of needed copies may be performed in the computer system 160 of the user organization. In this regard, the computer system 160 may run a software program 165 that performs the allocation of the position-coding pattern. Thereafter, the page description and the position-coding pattern may be printed by a printer connected to the computer system 160 of the user organization. As a further alternative, the printing of the page description and the position-coding pattern may be performed by a dedicated print shop. The print shop may receive the page description and the allocated position-coding pattern in order to perform the printing. Alternatively, the print shop may merely receive a page description and an order of the number of copies to be printed. Then, the allocation of position-coding pattern may be performed by the print shop running the software program 165. Further, the printing of the page description with the allocated position-coding pattern will be performed by the print shop.

Further, the ASP 150 may also create new controlling software that associates controlling instructions to portions of the position-coding pattern P that is allocated to be associated with a designed page description. This new controlling software may be provided to the electronic pens 100 that are to be used for writing on the form designed by the ASP 150 such that the electronic pen 100 will handle detected positions in the correct manner. Alternatively, the new controlling software may be stored in a computer system 160 and the electronic pen 100 may be arranged to transmit the detected positions to the computer system 160. In this way, the computer system 160 will know how the detected positions are to be handled, e.g. to associate information entered by handwriting with the pen in a correct field in the data management system.

Moreover, active areas which are to be associated with a specific function may be defined when designing a form. The definition of these areas may be stored with the page description and the position-coding pattern in an archive file. Detection of a position in an active area may create an event which may be used to trigger a specific action to be performed. Thus, if the archive file is stored in the electronic pen 100, the pen 100 may transmit events holding information of positions being detected in an active area in order to have the appropriate action performed by the computer system 160. Alternatively, the electronic pen 100 may itself store instructions related to a detection of a position in an active area for performing the specific action. These instructions may be provided as controlling software or as default instructions being related to certain types of active areas, wherein these default instructions may be commonly used. Such a default instruction may be to trigger sending of detected strokes from the electronic pen 100 to the computer system 160, where the detected strokes may be further processed.

The position-coding pattern P is proprietary and may therefore be controlled by a top controlling actor (TCA) 140, owning the right to the position-coding pattern P. The TCA 140 may exercise its ownership of the position-coding pattern P by controlling which parties that are allowed to utilize the position-coding pattern P and to what extent the parties are allowed to utilize the position-coding pattern P. Thus, the TCA 140 may maintain a control of who utilizes the position-coding pattern P and to what extent the position-coding pattern P is utilized. In this regard, the TCA 140 may control whether a party is to be able to provide writing surfaces 120 with portions of the position-coding pattern by printing a portion of the position-coding pattern on a paper or other substrate. The TCA 140 may also control whether a party is to be able to design writing surfaces to be provided with position-coding pattern and associating areas on the writing surface with instructions on how to process detected positions in the area. The TCA 140 may further determine what kind of actions of a pen 100 or an auxiliary device 130 may be associated with the position-coding pattern P utilized by a party. Thus, the TCA 140 may provide a right to utilize the position-coding pattern P for the purpose of e.g. recognizing handwritten characters, inputting data in a form for storing the inputted data in accordance with fields on the form, etc. The TCA 140 may, through the controlling of the use of the position-coding pattern P, ensure that the same pattern is not utilized twice by different parties avoiding a risk that an electronic pen may mix up the different uses of the pattern. Further, the TCA 140 may, by specifying the extent of allowed use of a portion of the position-coding pattern, set differentiated prices of the right to utilize a position-coding pattern P dependent on the extent of allowed use of the pattern. The TCA 140 may also allow a subsidiary controlling actor to manage a part of or the entire position-coding pattern P on behalf of the TCA 140.

In order to control the use of the position-coding pattern P, the TCA 140 distributes licenses to the position-coding pattern P. A license specifies to what extent use of the position-coding pattern P is allowed. The TCA 140 may provide licenses to each party that wants to utilize the position-coding pattern P as described above. The license may be provided as a license file that may be transmitted from the TCA 140 e.g. via a computer network 145, such as the Internet, or stored on a CD. An electronic pen 100 may receive a license file via an auxiliary device 130 providing connection to the computer network 145. Also, the TCA 140 may allow a subsidiary controlling actor to manage a part of the position-coding pattern. The subsidiary controlling actor may then receive a license ("parent license") from the TCA 140 and may be allowed to distribute sublicenses to other parties. A sublicense is based on a parent license and may not allow use of the position-coding pattern P exceeding the use allowed by its parent license. Also, sublicensing may be performed in several steps, i.e. a subsidiary controlling actor may distribute sublicenses to a further subsidiary controlling actor, which in turn may also be allowed to distribute sublicenses.

Figure 1D:
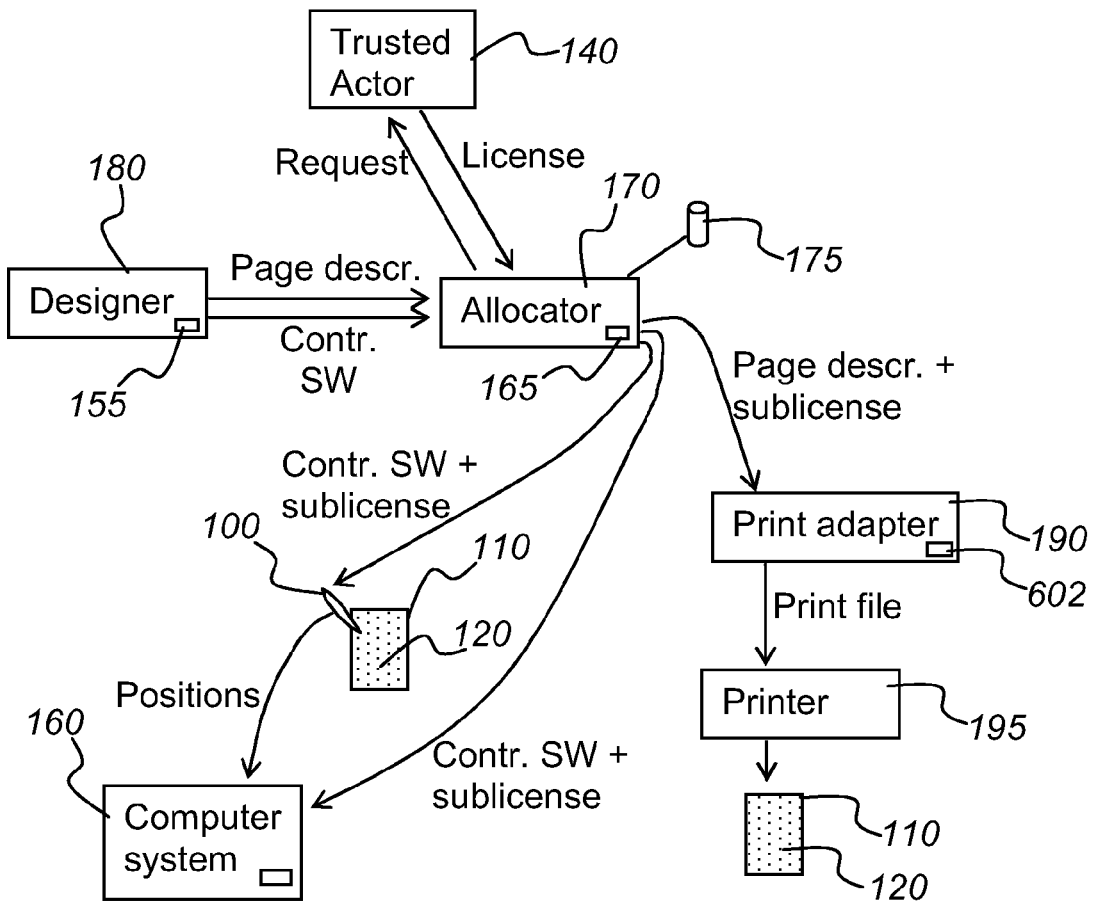
FIG. 1D schematically shows a system for using licenses to a position-coding pattern in design and printing of writing surfaces.
Figure 1B:
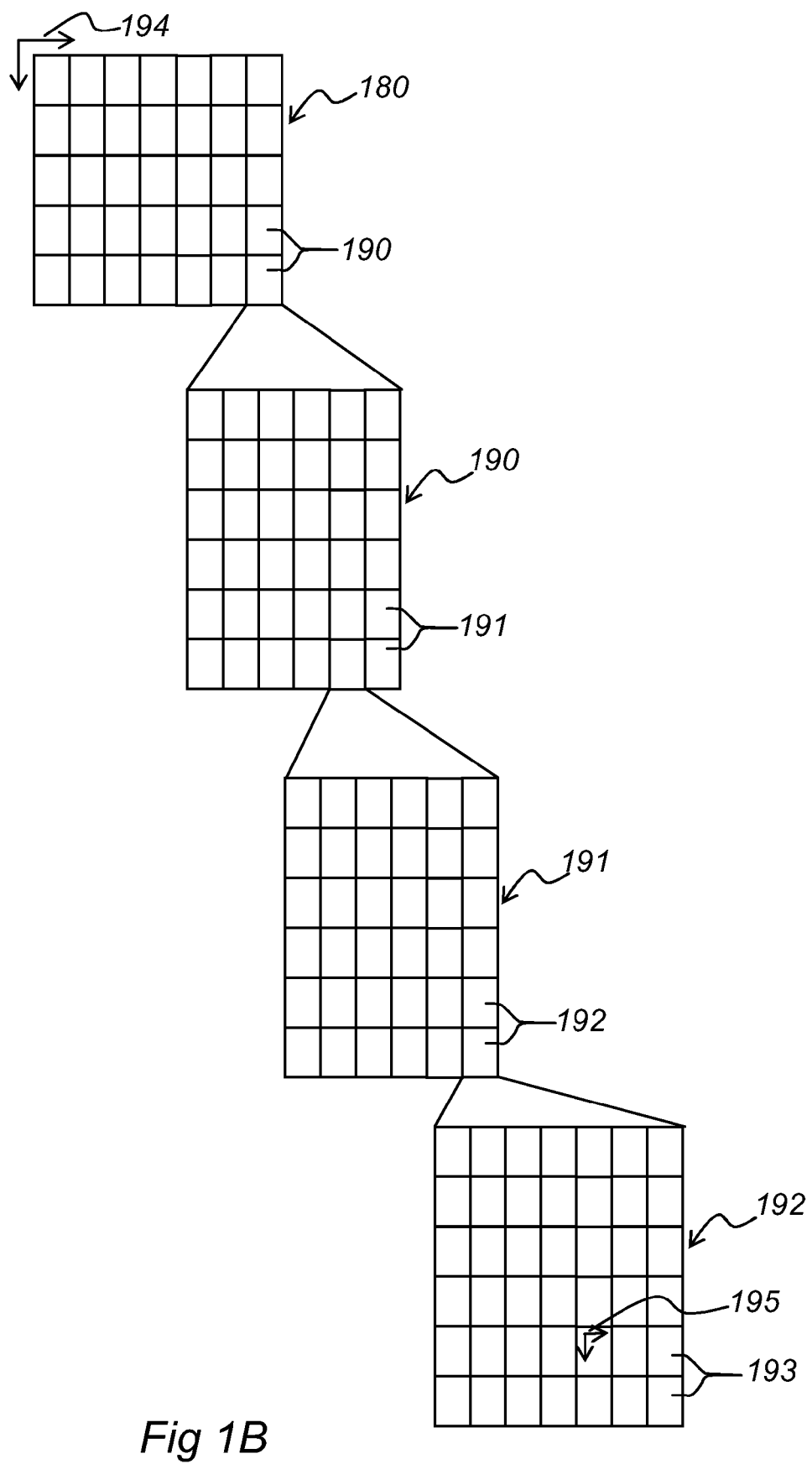
FIG. 1B shows an example of a logical division of a virtual position surface for use by the system of FIG. 1A.
Figure 1C:
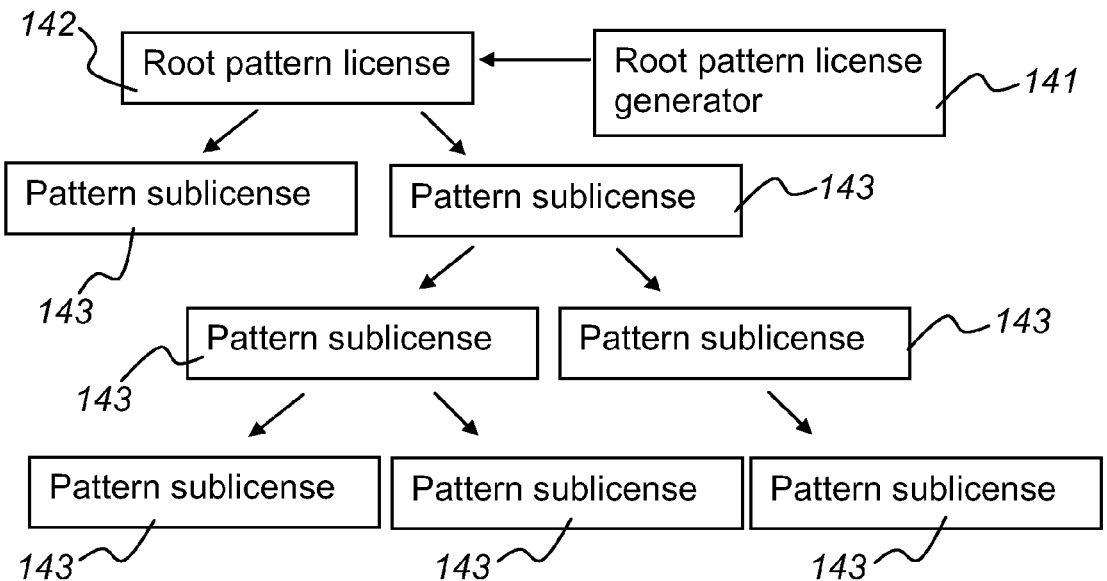
FIG. 1C schematically shows licensing of a position-coding pattern in several steps.

As shown in FIG. 1C, the TCA 140 may use a root pattern license generator 141 to create a root pattern license 142. Using this root pattern license 142, the TCA may create pattern sublicenses 143 through sublicensing. These sublicenses 143 may or may not be provided with the right to create further sublicenses 143. Thus, further sublicenses 143 may be created from at least some of the sublicenses 143, as illustrated in FIG. 1C.

A license may comprise a license specification defining a portion of the position-coding pattern P to which the license pertains. The license specification further defines to what extent the portion of the position-coding pattern P may be used by defining functionalities that a device may perform in conjunction with the position-coding pattern. Such functionalities may define whether a licensee is allowed to print the position-coding pattern or whether a licensee is allowed to design a writing surface with a position-coding pattern. The functionalities may further define what kind of instructions that may be associated with areas of the position-coding pattern. This may be used in allowing the instructions to be associated with areas of the position-coding pattern when designing a writing surface or in allowing an electronic pen or a computer unit to which the electronic pen transmits detected positions to perform the instructions. The functionalities defining the kind of instructions that may be associated with areas of the position-coding pattern may comprise e.g. recognition of handwriting; associating fields of a form with the positions for storing information in accordance with the fields on the form. The license specification may also comprise a definition of pen IDs of pens that are allowed to use the license and a definition of a time period during which the license is valid. Finally, the license specification may define whether the licensee is allowed to create sublicenses.

Referring now to FIG. 1D, use of licenses within a system for developing and printing products provided with position-coding pattern and capturing information with an electronic pen by writing on the printed products will be described. The system comprises a trusted actor 140. The trusted actor 140 may be the TCA or a subsidiary controlling actor which may prove that it has rightfully obtained control of a portion of the position-coding pattern from the TCA. Thus, licenses to portions of the position-coding pattern received from the trusted actor will be accepted by other parties as being authentic.

The system further comprises a designer 180, an allocator 170 and a print adapter 190 that will act for developing and printing products provided with position-coding pattern. Each unit 170, 180, 190 may be realized as a computing device running dedicated software for performing the required actions of the unit.

The trusted actor 140 will receive a request for a license from an allocator 170. In response, the trusted actor 140 will issue a license to the allocator 170, which license specifies a portion of the position-coding pattern and what functions that may be associated with the position-coding pattern. The allocator 170 and the trusted actor 140 may for example communicate over a computer network, such as the Internet. The allocator 170 stores the license in a license database 175.

A designer 180 may design a page description. The design of the page description may be performed in two different steps. In a first step, the physical layout is designed using an ordinary graphic design tool. In a second step, the mapping layout is designed to correspond to the physical layout using the software program 155. The page description is transmitted to the allocator 170 for associating a position-coding pattern to the page description. The designer 180 also creates controlling software that couples controlling instructions to positions on the designed page. The controlling software is also transmitted to the allocator 170 for associating a position-coding pattern to the controlling instructions.

The allocator 170 may store the page description and the controlling software. When new printed copies of a page description are needed, the allocator 170 may access the license in the license database 175 and allocate the required pages of position-coding pattern to the page description. Thus, a sublicense is created from the license and the sublicense is associated with the page description. The allocated position-coding pattern may also be associated with the controlling software. Thus, another sublicense is associated with the controlling software. The sublicenses specify to what extent the position-coding pattern may be used by the licensee receiving the sublicense. For example, the sublicense being associated with the page description will specify that the licensee is allowed to print the position-coding pattern. The sublicense being associated with the controlling software will not allow printing but may specify what actions an electronic pen may be allowed to perform in processing detected positions. The sublicenses are formed using the software program 165.

The page description and the associated sublicense are transferred to a print adapter 190, preferably in a common file or an archive file. The print adapter 190 may verify the use of the position-coding pattern. In this regard, the print adapter 190 comprises a software program 602 (see FIG. 6A) for reading a sublicense and checking that the sublicense stems from the trusted actor 140, that the sublicense has not been tampered with since forming of the sublicense by the allocator 170 and that the sublicense allows printing of the position-coding pattern. If the print adapter 190 approves the sublicense, the print adapter 190 may prepare a print file using the page description and the position-coding pattern. The print file is adapted to be read by a printer 195. Thus, the print adapter 190 sends the print file to the printer 195 for creating a hard copy of the page description and the allocated position-coding pattern.

Now, a printed product has been created. A pen user may now use an electronic pen 100 for writing on a writing surface 120 of the printed product 110.

The electronic pen 100 may receive controlling software and a sublicense from the allocator 170, the controlling software and the sublicense being stored in the memory block 212 of the electronic pen 100. The data processor 208 of the electronic pen 100 may first verify the sublicense in a manner similar to the verification by the print adapter 190 described above. Further, the data processor 208 may check whether the sublicense allows the electronic pen 100 to perform specific actions. The controlling software may thus associate instructions with positions within the position-coding pattern defined by the sublicense. These instructions may trigger the electronic pen 100 to perform a specific action when a position is detected.

The electronic pen 100 may receive the sublicense in a common file or archive file, which also holds the page description. Thus, the sublicense to the print adapter 190 and to the electronic pen 100 may be distributed in the same manner and a common file format may be used for the page description and sublicenses throughout the system. As explained above, the common file or archive file may also include information of active areas, which are associated with specific functions. The controlling software may then include instructions on actions to be performed in response to detection of a position in an active area.

The controlling software may be distributed within the common file or archive file or in a separate file. Alternatively, the electronic pen 100 may be preprogrammed with instructions for performing specific actions in response to detection of a position in an active area. These active areas are then specifically defined in the archive file. Also, a combination of preprogrammed instructions and instructions provided in the controlling software may be used.

Alternatively, the electronic pen 100 may send detected positions to a computer system 160 and no further action is taken by the electronic pen 100. In this case, the controlling software and the sublicense have been transmitted to the computer system 160 for allowing the computer system 160 to associate instructions with positions. Also, the electronic pen 100 may send information of detection of positions in active areas and the controlling software in the computer system 160 may provide actions associated with the active areas. Finally, the information entered by writing on a printed product 110 using the electronic pen 100 may be stored in a data management system of the computer system 160.

The designer 180, the allocator 170 and the print adapter 190 have been described above as separate units. The use of licenses allows the handling of the position-coding pattern to be separated in this way, which allows separate parties to only perform duties that they are specialized in. As mentioned above, each unit may be realized as a computing device running dedicated software for performing the required actions of the unit. The software programs 155, 165, 602 may originate from the TCA 140 and be specifically adapted to the handling of the position-coding pattern. Further, the software program 155, 165, 602 may prevent use of the position-coding pattern unless a proper license exists.

However, it is also contemplated that two or more of the designer, allocator and print adapter units may be integrated. For example, the designer may also allocate position-coding pattern to a page description. Then, the page description and a sublicense to the position-coding pattern may be sent to a print adapter 190. In this case, the designer receives a license from the trusted actor to be able to allocate position-coding pattern. The allocating may be performed using the software program 155. In another example, the print adapter 190 may also allocate position-coding pattern to a page description. In this case, the designer 180 sends the page description directly to the print adapter 190.

A user of an ASP may be specialized in developing page descriptions. The user may then use the designer 180 to create a form, which is transmitted to an organization that wants to use the form in data capture, e.g. a healthcare organization that wants to capture information on patients. When hard copies of the forms are needed, a position-coding pattern may be allocated at a computing device of the healthcare organization. The page description and the allocated position-coding pattern may then be sent to a specialized print shop for creating the hard copies. It is especially advantageous to use the print shop when a large amount of copies are needed. In this case, the allocator 170 may be implemented in the computer system 160 that later will handle the captured information. Thus, the association of position-coding pattern to a page description may be performed at the organization that is to handle data captured on forms.

Figure 3:
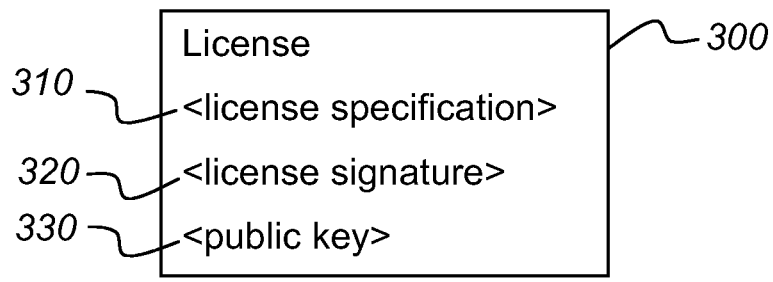
FIG. 3 is a schematic illustration of a license file defining a portion of a position-coding pattern and to what extent the portion of the position-coding pattern may be used.

Referring now to FIG. 3, a detailed description of a license will be given. The license may be provided in the form of a license file 300, which comprises a license specification 310, a license signature 320, and a public key 330 of an asymmetric key-pair. The public key 330 may be used for decrypting the license signature 320 and the license signature 320 provides a hash value of the license specification 310 as originally created. Therefore, the license signature 320 and the public key 330 allow a licensee to ensure that the license has not been tampered with, as will be further described below. A license file further comprises a copy of a root license, which the TCA 140 handles for generating licenses. This allows a licensee to ensure that the license originates from the TCA 140.

The license specification 310 comprises values for a number of parameters defining the license and also comprises values for a number of parameters defining the extent to which the license may be used. Thus, the parameters may comprise:

License ID
Parent License ID
License Name
License Owner
Creation Date
Validity Period
Pen ID Range
User ID
Page Width
Page Height
Page Range
Functionality License ID is an ID set by the issuer or the holder to identify the license. Parent License ID is the ID of the (parent) license from which the instant license has been sublicensed. License Name indicates the name of the license in clear text, and License Owner indicates the name of the license owner in clear text. Creation Date indicates the date when the license was created. Validity Period indicates when the license expires, for example via an explicit expiry date, or a time period from the creation date. Pen ID Range indicates one or more specific pens for which the licensed is valid. User ID indicates a specific user for which the license is valid. Page Range indicates the page addresses for which the license is valid. Page Range is provided as an interval of pages, books, shelves or segments in the page address format, as described above with reference to FIG. 1B. Page Width and Page Height indicate the size of one page in the Page Range. Functionality indicates permissions of using the position-coding pattern.

Functionality may include any one of the following subparameters, which may be set to true or false depending on access privilege:

Print—allows the position-coding pattern to be printed on a writing surface

Sublicense—allows creation of a sublicense from the instant license

Develop—allows use of the position-coding pattern in development of predefined templates that control how detected positions are to be handled Send—allows an electronic pen to access its communications interface for transmitting data recorded in association with the position-coding pattern Store—allows an electronic pen to access its internal memory for storage of data recorded in association with the position-coding pattern Encrypt—allows encryption of data that is recorded in association with the position-coding pattern Barcode—allows an electronic pen access to barcode reading and interpreting facilities Dotcode—allows the position-coding pattern to code positions in one direction and data in an orthogonal direction on a writing surface Stream—allows an electronic pen access to communications interface to output data in near-real time HWR—allows an electronic pen access to hand-writing recognition facilities to convert detected positions to computer text TTS—allows an electronic pen access to text-to-speech conversion facilities to convert computer text to speech The TCA 140 manages a top-most set, which is defined by the entire position-coding pattern P, all functionalities that may be associated with specific parts of the position-coding pattern, an infinite validity time period and a range of all pen IDs. Thus, the top-most set comprises all available combinations of the position-coding pattern, functionalities, validity time period and pen IDs. The TCA 140 may define subsets of the top-most set and distribute the subsets in the form of licenses. The TCA 140 may manage the top-most set via root licenses. A root license defines a large portion of the position-coding pattern, such as a logical segment, and typically encompasses all combinations of functionalities, validity time period and pen IDs within the portion of the position-coding pattern. The TCA 140 creates licenses from a root license for the distribution of licenses.

Thanks to the use of licenses which set permissions on the extent of allowed use of the position-coding pattern, the TCA 140 may effectively control how the position-coding pattern is used while allowing the administration of the position-coding pattern to be distributed. In particular, the functionalities that are specified in the license may be used for verification whether a user is allowed to use the position-coding pattern in a desired manner.

Also, since it is possible to create sublicenses to owned portions of a position-coding pattern, actions may securely be divided between several parties. For example, an allocator may let a print shop print the position-coding pattern without allowing the print shop more extensive rights to the position-coding pattern than needed by the print shop.

Specifically, the license specification will indicate whether the licensee has the right to print the position-coding pattern. Thus, the right to print the position-coding pattern may only be given to a licensee that actually needs to print the position-coding pattern. For example, a license associated with controlling software for a pen will not allow printing of the position-coding pattern. Thus, the license will prevent the position-coding pattern from being printed by a party receiving the controlling software. In this way, the printing of the position-coding pattern may be performed by a number of different parties without a risk of conflicting pattern existing, i.e. the same portion of the pattern being printed several times by different users causing electronic pens to interpret detected positions according to a scheme of a first design using a specific portion of the position-coding pattern while the pen is used on a writing surface with position-coding pattern according to a scheme of a second design.

Now, the use of licenses for controlling the position-coding pattern will be described in a number of specific situations, namely developing of a design of a writing surface, combining a design of a writing surface with a position-coding pattern and outputting a design of a writing surface and a position-coding pattern to a printer.

Figure 4A:
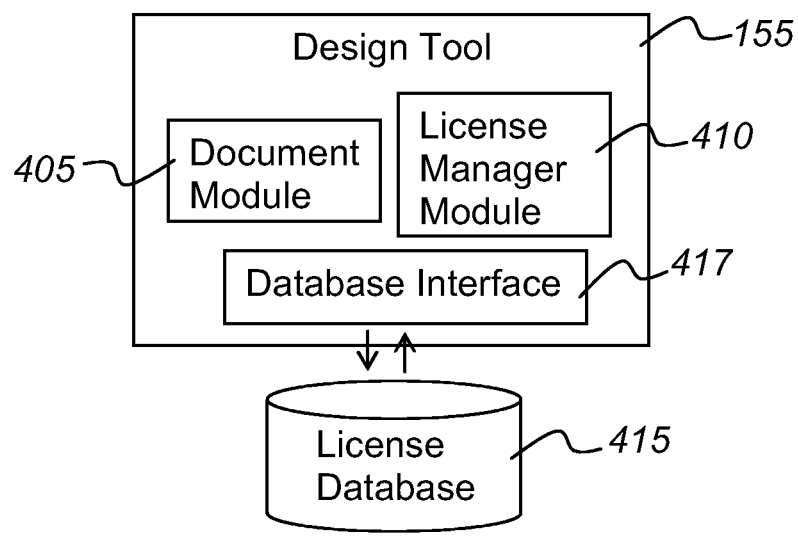
FIG. 4A is a schematic illustration of a software program for designing writing surfaces and associating areas on the writing surface with instructions on how to process detected positions in the area.
Figure 4B:
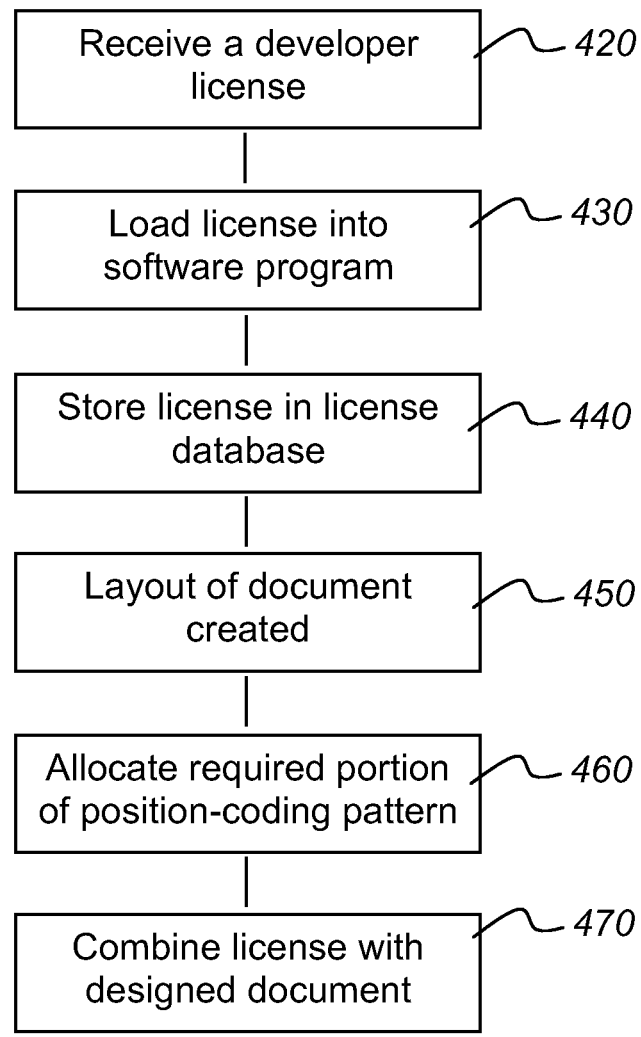
FIGS. 4B-4C are flow charts illustrating a method in designing writing surfaces.
Figure 4C:
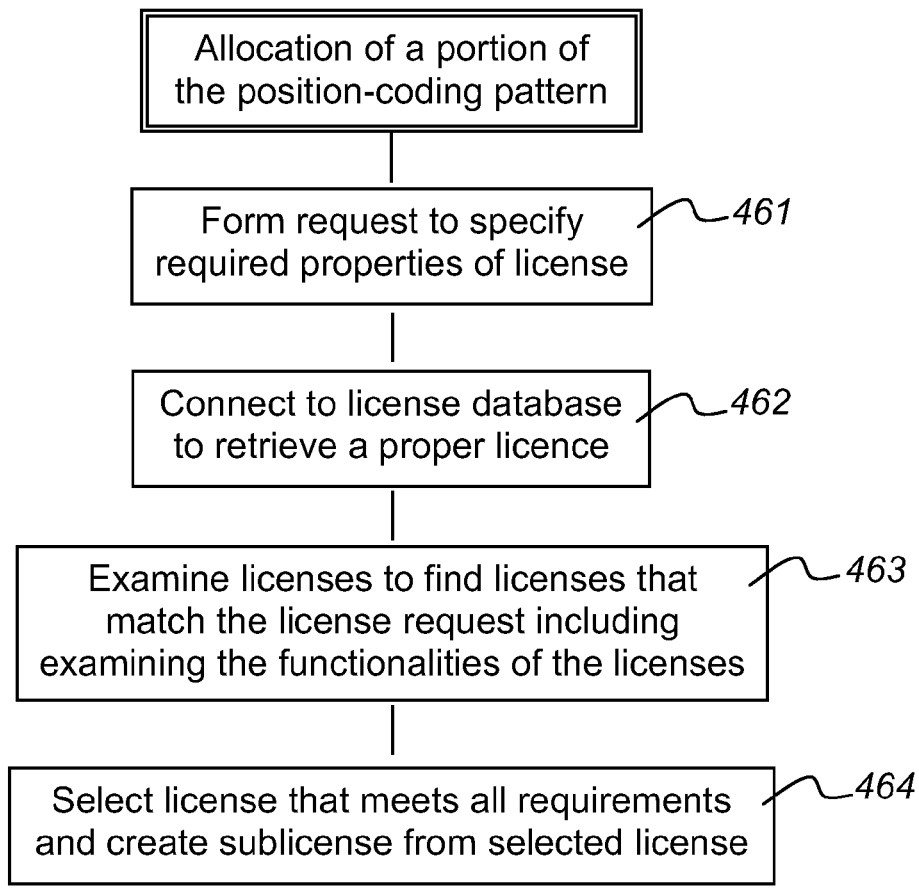

Referring to FIGS. 4A-4C, the use of a license in a software program 155 for designing writing surfaces and associating areas on the writing surface with instructions on how to process detected positions in the area will be described. The software program 155 may be run on a computer of an ASP 150, whereby a user may interact with the computer for designing writing surfaces. As shown in FIG. 4A, the software program 155 for designing writing surfaces comprises a document module 405, which a user may interact with for creating a page description of an electronic document to be printed. The software program 155 further comprises a license manager module 410, which is arranged to provide areas of a position-coding pattern to be incorporated in the electronic document. The license manager module 410 interacts with a license database 415 via a database interface 417 for allocating position-coding pattern P to the electronic document.

As shown in FIG. 4B, a method in designing writing surfaces comprises receiving a license from the TCA 140 or a subsidiary administrator, step 420. The license is loaded into the software program 155 for designing writing surfaces, step 430. The license manager module 410 stores the license in the license database via a database application programming interface (API), step 440.

The user may now design a writing surface and associate it with a position-coding pattern. Thus, the user creates a physical and a mapping layout of the document, step 450. The designed page description comprising the physical and mapping layout should be combined with a position-coding pattern for allowing a writing surface on the printed product to be provided with a position-coding pattern.

The license manager module allocates the required portion of the position-coding pattern via the database API, step 460, forming a sublicense defining the allocated portion of the position-coding pattern, as will be further described below with reference to FIG. 4C.

Now, the acquired sublicense is associated with the page description, step 470. The page description and the associated sublicense may thereafter be transferred to a software program for outputting the document to a printer.

Also, controlling software may be developed and associated with a sublicense. The controlling software and the sublicense may be transferred to an electronic pen for providing the electronic pen with information on how to process detected positions within the portion of the position-coding pattern of the sublicense. When the sublicense is to be outputted to a printer, the Print functionality needs to be set to true to allow the document to be printed, whereas, when the sublicense is to be transferred to an electronic pen, the Print functionality should be set to false in order to prevent the pen user from printing the document.

Referring now to FIG. 4C, the allocation of a portion of the position-coding pattern will be further described. In this regard, a request is formed by the software program 155 that specifies the required properties of a license, step 461. The license manager module 410 receives the license request and connects to the license database 415 through the database API for retrieving a proper license, step 462. The license manager module 410 examines the licenses in the license database in order to find a license that matches the license request and enables forming of a proper license, step 463.

Thus, the license manager module 410 checks whether the license allows sublicensing, i.e. whether the Sublicense functionality is set to true. Further, the license manager module checks whether the license contains sufficient amount of position-coding pattern to cover all pages of the document. Here, the license manager module 410 checks the Page Range of the license to determine whether it contains the required number of pages. Then, the license manager module 410 checks whether the page size of the pattern in the license matches the page size of the document, i.e. whether the Page Width and Page Height are sufficiently large. Now, the license manager module 410 checks whether the license contains the required functionalities. In this regard, the license manager module 410 compares the desired functionalities of the license request to the allowed functionalities of the license. Specifically, the license manager module 410 checks whether the Print functionality is allowed such that the document may be printed with the position-coding pattern.

If a license meets all requirements of the license request, the license is selected and a sublicense may be created from the selected license, step 464. Advantageously, the license manager module may select the license that has least permissions of Functionalities, while still meeting all required Functionalities of the license request. In this way, a license that has a lot of permitted Functionalities need not be used when these Functionalities are not requested. Instead, the license may be stored until the Functionalities are requested. The license manager module 410 then allocates position-coding pattern from the selected license. Thus, the license manager module 410 changes the Page Range parameter of the selected license to indicate that the license no longer comprises the allocated pattern. The changed selected license is stored in the database.

The Page Range parameter of the sublicense is set to define the allocated pattern. For example, the license may indicate a Page Range starting at page address 1.0.0.0 and ending at page address 1.0.0.99, i.e. covering 100 pages. When a sublicense of 50 pages is to be created, the Page Range of the license may be changed to start at 1.0.0.50, whereby the first 50 pages are allocated. The Page Range of the sublicense will thus be defined as starting at page address 1.0.0.0 and ending at page address 1.0.0.49. Alternatively, the Page Range parameter may further comprise a Pages Left parameter, which defines the number of pages that have not been allocated. In such case, the license above would initially have a Pages Left parameter set to 100. When the sublicense of 50 pages is created, the Pages Left parameter would be changed to 50 and no other changes to the Page Range is made in the license. The sublicense would define the Page Range as above, further defining that Pages Left is 50. Next time a sublicense is to be created from the license, e.g. if another 20 pages are to be allocated, the page address of the start of the Page Range of the sublicense would be determined as 1.0.0.99-49, i.e. the Pages Left value minus 1 is subtracted from the page address of the end of the license to determine the start. The Page Range of the new sublicense will thus be set to start at page address 1.0.0.50 to end at page address 1.0.0.69 with Pages Left set to 20.

Further, the license manager module sets the parameters of the sublicense according to the license request. Specifically, the functionalities that are required are set to true and all other functionalities may be set to false. Thus, the license manager module 410 creates a license file that defines the sublicense. The license file also comprises a copy of the root license, which is obtained from the license database. Further, the license manager module 410 creates a sublicense signature and attaches a public key for decrypting the license signature to the license file, as will be further described below. The license file is then associated with the page description.

Figure 5A:
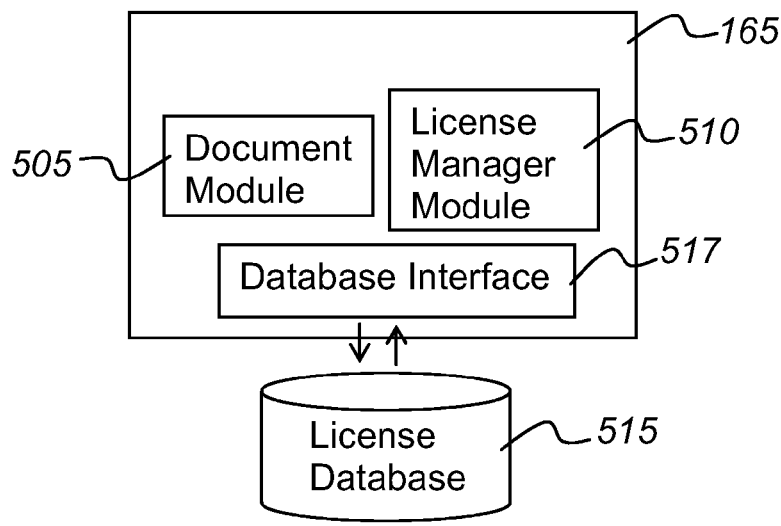
FIG. 5A is a schematic illustration of a software program for combining a page description with a portion of the position-coding pattern.
Figure 5B:
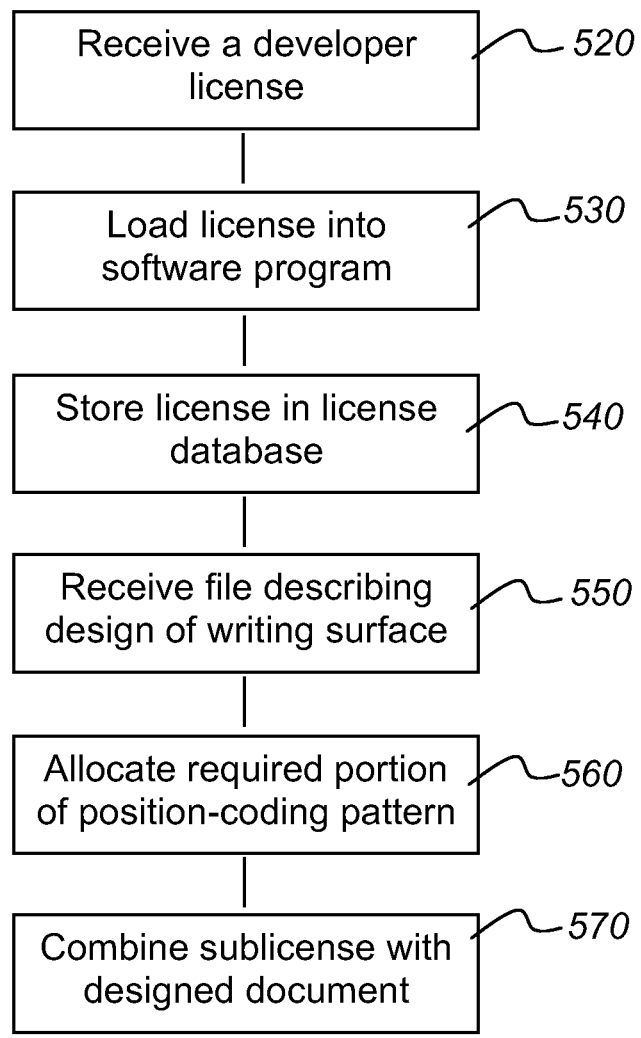
FIG. 5B is a flow chart illustrating a method for combining a page description with a portion of the position-coding pattern.

Referring now to FIGS. 5A-5B, the use of a license in a software program 165 for combining a previously designed page description with a portion of the position-coding pattern will be described. The software program 165 may be run on a computer, which may be positioned e.g. at premises of a company using forms for input of data via an electronic pen. The computer may thus be requested to print documents when forms are needed. The software program 165 may also be used for combining any document with a portion of the position-coding pattern. Thus, the position-coding pattern may be combined with an ordinary document, such as a text file, e.g. a Microsoft Word® document, or a picture file, e.g. a jpeg-file. The ordinary document contains merely a physical layout and no mapping layout. Then, a portion of the position-coding pattern is allocated to fit the entire size of the physical layout to form an electronic document comprising the physical layout and a sublicense to the position-coding pattern. The electronic document may thereafter be printed and an electronic pen may be used for e.g. making notes in the printed document. Using the position-coding pattern, the notes may be captured and combined with the electronic document in the computer for displaying the notes with the physical layout.

As shown in FIG. 5A, the software program 165 comprises a document module 505 for reading a file describing a page description including a mapping layout or an ordinary document comprising only a physical layout. The software program 165 further comprises a license manager module 510, which is arranged to provide areas of a position-coding pattern to be incorporated in the electronic document. The license manager module 510 interacts with a license database 515 via a database interface 517 for allocating position-coding pattern to the electronic document.

As shown in FIG. 5B, a method in combining a page description with a position-coding pattern comprises receiving a license from the TCA 140 or a subsidiary administrator, step 520. The license is loaded into the software program for combining position-coding pattern with page descriptions, step 530. The license manager module stores the license in the license database via a database application programming interface (API), step 540.

The software program may now receive a file with a page description, step 550, by a user loading the file into the software program. This page description may be stored on the computer for later use when the document is to be printed. When the document is to be printed, the license manager module may allocate the required portion of the position-coding pattern via the database API, step 560. This is performed in the same way as described above with reference to FIG. 4C.

Now, the acquired sublicense is associated with the page description, step 570. This page description and the sublicense may thereafter be transferred to a software program for outputting the document to a printer.

Figure 6A:
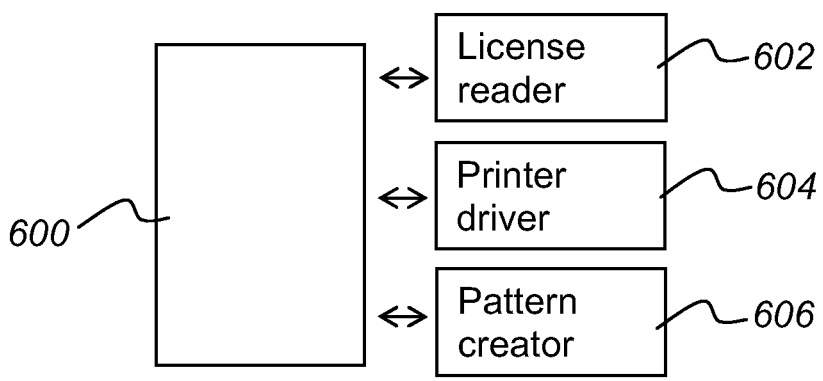
FIG. 6A is a schematic illustration of a software program for outputting a document with a position-coding pattern to a printer.
Figure 6B:
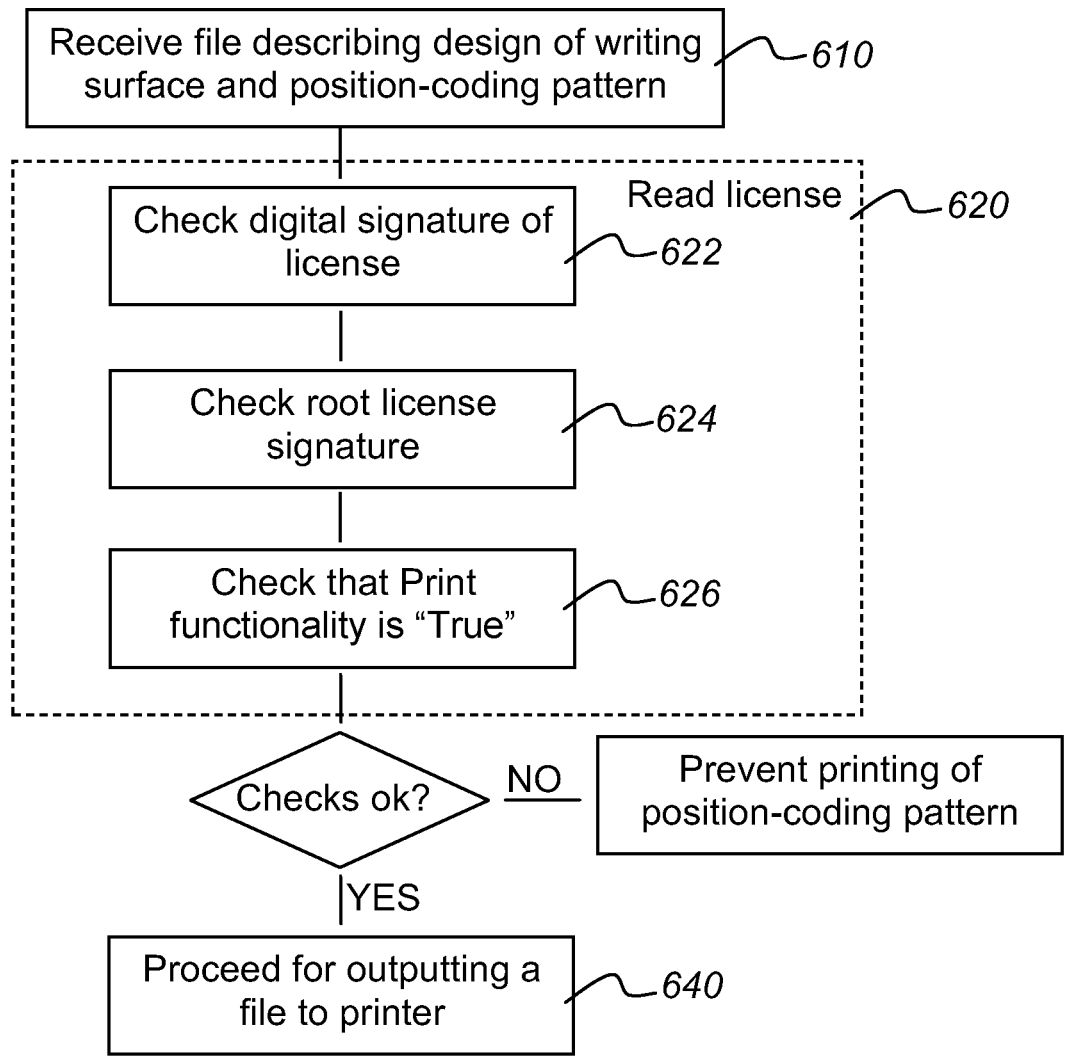
FIG. 6B is a flow chart illustrating a method for outputting the document with a position-coding pattern to a printer.

Referring now to FIGS. 6A-6B, the use of a license in a software program 600 for outputting a document to a printer will be described. The software program 600 may be run on a computer which is connected to a printer for preparing a print file to be outputted by the computer to the printer. As shown in FIG. 6A, the software program 600 communicates with a license reader 602, which is a software program that is adapted to read and interpret license files in order to verify that the license file is appropriately used. The software program 600 further communicates with a printer driver 604, which is adapted to convert data to be printed to a form that is specific to the printer. The software program 600 may thus receive a file describing the document to be printed and may call the license reader 602 and the printer driver 604 for verifying a license to the position-coding pattern and for converting the electronic document to a form that is specific to the printer. Also, the software program 600 may communicate with a pattern creating software module 606, which is arranged to create the actual physical presentation of the position-coding pattern based on the page address of the license. The pattern creating software program 606 may be a part of the printer driver 604.

Referring now to FIG. 6B, a method for outputting the print file to a printer for printing the document will be described in more detail. The computer that is connected to the printer receives a page description and the license to a position-coding pattern associated with the page description, step 610. Alternatively, the page description and the license are created in the computer. The software program 600 may now call the license reader to read the license to the position-coding pattern, step 620. The license reader first checks a digital signature of the license in order to ensure that the license has not been improperly modified by an unauthorized party, step 622. The license reader thereafter checks a root license signature in order to ensure that the license originates from the TCA, step 624. These checks of digital signatures will be further described below.

The license reader further checks that the Print functionality is set to true in order to verify that printing of the position-coding pattern is allowed, step 626.

If none of the checks made by the license reader fails, the software program may proceed to output a file to the printer for printing of the document, step 640. In this regard, the software program calls the pattern creating software module in order to create a representation of the physical appearance of the position-coding pattern. Thus, if the license has been tampered with or if the license does not allow printing, the software program will not allow a physical appearance of the position-coding pattern to be formed and will therefore effectively prevent the position-coding pattern from being printed.

Similarly to the check of the license for printing of a position-coding pattern, a license may also be checked in an electronic pen for allowing the pen to handle positions of the position-coding pattern. The electronic pen may store controlling software associating controlling instructions to portions of the position-coding pattern. When the electronic pen detects positions with a position-coding pattern, a license reader installed in the pen may check that the pen has a license which is related to the part of the position-coding pattern that is detected by the pen. Further, the electronic pen checks the functionalities that are associated with the license in order to confirm that the desired functions of the pen in interaction with the position-coding pattern are allowed. When this has been confirmed, the electronic pen may perform the desired action, such as reading a barcode or encrypting the strokes written by the pen.

Figure 7A:
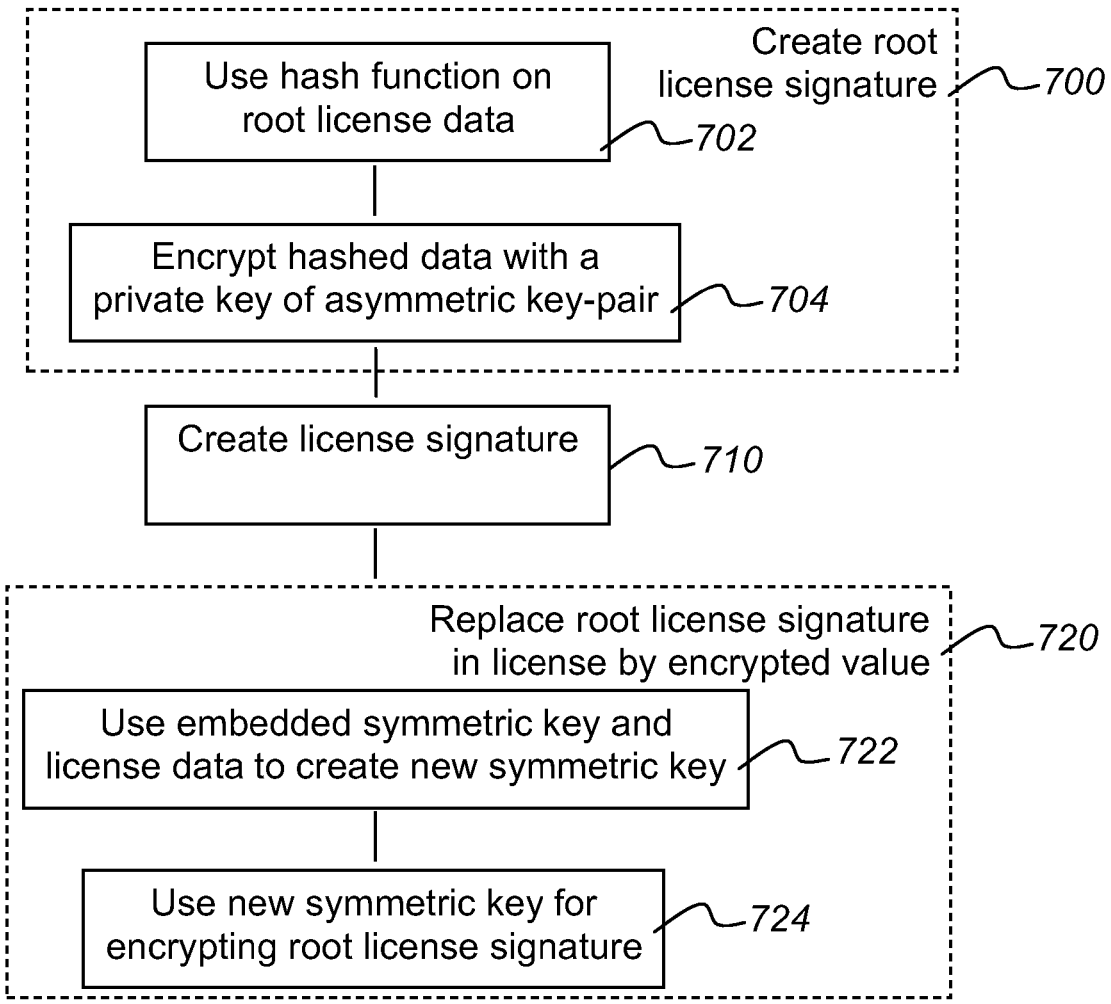
FIGS. 7A-7B are flow charts illustrating methods for encryption and decryption that enable verification of authenticity and integrity of a license.

Referring now to FIG. 7A, a method of encryption that enables verification of authenticity and integrity of a license will be described. The top controlling actor uses an asymmetric encryption of root licenses. When a root license to be managed by the top controlling actor is generated, a root license signature is created, step 700. The creating of the root license signature comprises using a hash function on the root license data, step 702, to create a manageable data size (e.g. 32 bytes when Advanced Encryption Standard is to be used for encryption). The root license data may be a root license specification that defines the root license. Thereafter, the hashed root license data is encrypted with a private key of an asymmetric key-pair to create the root license signature, step 704. The asymmetric key-pair is created by the TCA and the public key of the asymmetric key-pair will be embedded into the license manager module and the license reader, provided by the TCA, to enable the root license signature to be decrypted. This root license signature ensures authenticity and integrity of the root license, as will be further described below.

When a license is to be created from a root license, two mechanisms for security are embedded. When the license manager module creates the license, the license manager module automatically generates an asymmetric key-pair. This asymmetric key-pair is uniquely created for each license. The public key will be included in the license data and will be part of the license file. A license signature will be created by using a hash function on the license data and encrypting the hashed license data with the private key of the asymmetric key-pair created by the license manager module, step 710. The license signature provides a first mechanism for security.

Further, the root license will be included in the license file in order to enable verification that the license is authentic and has not been tampered with. However, the root license signature is replaced by an encrypted value, step 720, to prevent the root license from being used by just cutting the root license portion from the license file. Thus, it is not possible for a party other than the TCA to enter the root license into a license manager module for creating new licenses based on the root license. In this regard, a symmetric key which is embedded in the license manager module is used for creating a new symmetric key, step 722. The new symmetric key is obtained based on a function of the embedded symmetric key and the license. The function may comprise an XOR-function of the embedded symmetric key and a hash of the license signature. The new symmetric key is then used for encrypting the root license signature, step 724, to create the encrypted value. This encrypted value of the root license signature provides the second mechanism for security.

When a sublicense is to be created from a parent license, the two mechanisms for security are embedded in the same way as for licenses described above. Thus, a sublicense signature is created using an asymmetric key-pair created by the license manager module. Further, the root license signature is replaced by an encrypted value using a new symmetric key that is obtained based on a function of the embedded symmetric key and the sublicense.

Figure 7B:
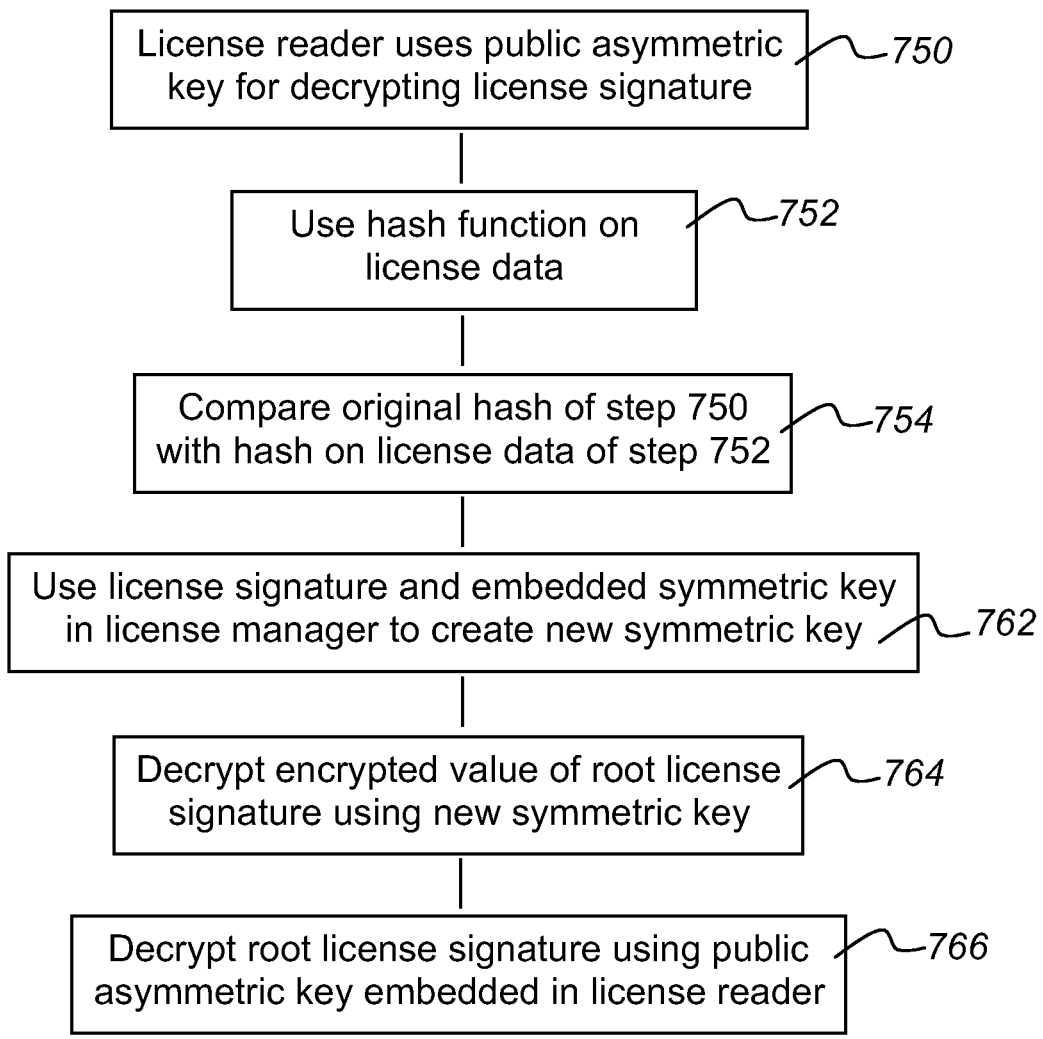
Figure 8:
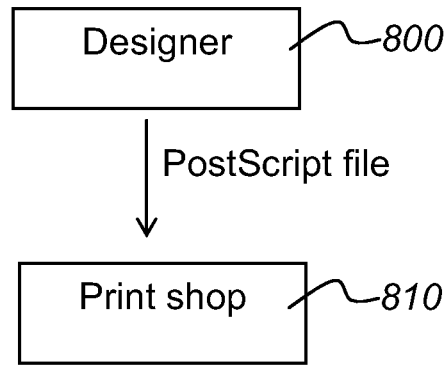
FIG. 8 is a schematic view of a prior art system for printing of documents comprising a position-coding pattern.

Referring now to FIG. 7B, a method for verification of authenticity and integrity of a license will be described. When a license is to be used, e.g. for entering the license into a license database or for printing a portion of the position-coding pattern, the license reader will first verify the license. Firstly, the license reader uses the public asymmetric key, which is incorporated in the license file, for decrypting the license signature, step 750. This will recreate the original hash of the license data. Thereafter, the license reader will use the hash function on the license data, step 752. Then, the original hash as obtained by decrypting the license signature is compared with the hash obtained by using the hash function on the license data, step 754. If these values differ, the license has been manipulated or tampered with after creation of the license. Thus, this check will verify the integrity of the license data.

Next, the license signature and the symmetric key that is embedded in the license reader are used in order to create a new symmetric key, step 762. The new symmetric key is then used in order to decrypt the encrypted value of the root license, step 764. Now, the root license signature will be obtained. Thereafter, the root license signature is decrypted using the public asymmetric key which is embedded in the license reader, step 766. This decrypted root license signature represents an original hash of the root license data and is now compared to a new hash of the root license data which is created by the license reader. If these two hash values are equal it may be concluded that the root license data has not been manipulated or tampered with and that the root license is authentic.

Generally, a method of licensing a position-coding pattern which allows encoding of positions on a printed product may comprise: accessing a root license that defines a position-coding pattern, said root license comprising a data record allowing verification of integrity of the root license to enable assuring that the root license has not been tampered with, forming a sublicense to a portion of the position-coding pattern in the root license, said sublicense also comprising a copy of the root license to provide evidence of the origin of the license, and encrypting the root license signature before the root license is copied into the license, said encrypting comprising encrypting the root license signature using a symmetric key based on data of the formed sublicense.

Thanks to the encrypted signature of the root license, it is not possible for a non-allowed party to use the root license. Therefore, it is ensured that the root license is not entered into a license manager module for extracting new licenses from the root license. Also, the root license signature ensures that a license originates from the TCA. However, this is accomplished without any need of exchanging encryption keys. Therefore, the security model is simple and requires no extra communication between a licensor and a licensee. Furthermore, even if a party would be able to restore the root license signature, it is impossible to modify the root license due to the root license signature being formed with an asymmetric key.

Further, the license signature ensures that the license has not been tampered with after creation of the license. Thus, it is prevented that a party extends the license, e.g. by extending the Page Range. Instead, if a licensee desires a broader license, it will need to be properly acquired from the licensor.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the position-coding pattern may be represented in the license as a range of actual positions.

A sublicense may comprise a copy of an entire chain of licenses from the root license to the sublicense. Each of these licenses may comprise an encrypted digital signature. Thus, the check that the sublicense originates from the TCA may also confirm that none of the licenses in the chain between the root license and the sublicense has been tampered with. Further, if asymmetrical keys are used for encrypting the digital signatures authenticity of each license in the chain may be confirmed. Such schemes for providing encryption in chains of licenses are described in more detail in WO 2006/041387 and in SE 0600842-9, which are both incorporated herein by reference.

The invention claimed is:

1. A method in a computer for creating an electronic document to be printed, said document comprising a page description representing a layout of the document, said method comprising:
    retrieving, by a processor of the computer, a license from a database stored in memory, said license defining a position-coding pattern, which is capable of encoding positions on a product when printed,
    selecting at least a portion of the position-coding pattern in the retrieved license to be associated with the page description,
    forming a sublicense from said license, said sublicense comprising a definition of the selected at least portion of the position-coding pattern, an indication of an origin of the sublicense to enable assuring that the sublicense stems from a trusted actor, and a data record allowing verification of integrity of the sublicense to enable assuring that the sublicense has not been tampered with,
    associating said sublicense with said page description, and
    changing, by the processor, the retrieved license to indicate that the selected portion is no longer part of the license.

2. The method according to claim 1, wherein said sublicense comprises area identifiers for providing the definition of the selected at least portion of the position-coding pattern.

3. The method according to claim 1, wherein said sublicense further comprises an indication that printing of the selected at least portion of the position-coding pattern is permitted.

4. The method according to claim 1, wherein said data record allowing verification of integrity comprises an encrypted digital signature of the sublicense.

5. The method according to claim 4, wherein said forming comprises creating an asymmetric key-pair comprising a private key and a public key, and using the private key to encrypt the digital signature of the sublicense, and wherein said sublicense comprises the public key.

6. The method according to claim 4, wherein said digital signature is obtained by forming a hash value of sublicense data.

7. The method according to claim 1, wherein said sublicense comprises a copy of a root license to indicate the origin of the retrieved license.

8. The method according to claim 7, wherein the root license comprises a data record allowing verification of integrity of the root license to enable assuring that the root license has not been tampered with, said data record allowing verification of integrity of the root license being encrypted before the root license is copied into the license, said encrypting comprising encrypting the data record using a symmetric key based on data of the formed sublicense.

9. The method according to claim 1, wherein said changing comprises amending a value indicating a number of pages that have not yet been selected from the license.

10. The method according to claim 1, wherein said changing comprises amending a value indicating a position identification of a starting position of the position-coding pattern in the license.

11. The method according to claim 1, further comprising storing a changed license in the database based on the change in the retrieved license.

12. A non-transitory computer-readable storage medium storing instructions, which when executed by a processor, cause the processor to perform the method according to claim 1.

13. A device for creating an electronic document to be printed, said document comprising a page description representing a layout of the document, said device comprising:
- a license database, which stores licenses defining a position-coding pattern, which is capable of encoding positions on a product when printed,
- a processor, which is connected to the license database, and which is adapted to:
    - retrieve a license from the license database,
    - process the retrieved license,
    - select at least a portion of the position-coding pattern in the retrieved license to be associated with the page description, and
    - form a sublicense from said license, said sublicense comprising a definition of the selected at least portion of the position-coding pattern, an indication of an origin of the sublicense to enable assuring that the sublicense stems from a trusted actor, and
- a data record allowing verification of integrity of the sublicense to enable assuring that the sublicense has not been tampered with, and to associate said sublicense with said page description,
- wherein the processor is further adapted to change the retrieved license to indicate that the selected portion is no longer part of the license.

14. A system for developing and printing an electronic document, said system comprising:
- a design unit, which is arranged to run a software program that is adapted to create a page description representing a layout of the document;
- a sublicensing unit, which is adapted to:
    - retrieve a license from a database, said license defining a position-coding pattern, which is capable of encoding positions on a product when printed,
    - select at least a portion of the position-coding pattern in the retrieved license to be associated with the page description, and
    - form a sublicense from said license, said sublicense comprising a definition of the selected at least portion of the position-coding pattern, an indication of an origin of the sublicense to enable assuring that the sublicense stems from a trusted actor,
- a data record allowing verification of integrity of the sublicense to enable assuring that the sublicense has not been tampered with, and associating said sublicense with said page description,
- wherein the sublicensing unit is adapted to change the retrieved license to indicate that the selected portion is no longer part of the license; and
- a printing unit, which is arranged to receive the page description and the sublicense from the sublicensing unit, and to read and examine the sublicense in order to ensure that the sublicense stems from a trusted actor and has not been tampered with.

* * * * *